United States Patent
Kawase et al.

(10) Patent No.: US 9,296,311 B2
(45) Date of Patent: Mar. 29, 2016

(54) FUEL-CELL VEHICLE

(71) Applicant: HONDA MOTOR CO., LTD., Tokyo (JP)

(72) Inventors: Satoru Kawase, Wako (JP); Kiyoshi Handa, Wako (JP); Kazuyuki Kadowaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/730,236

(22) Filed: Jun. 4, 2015

(65) Prior Publication Data
US 2015/0352974 A1    Dec. 10, 2015

(30) Foreign Application Priority Data

Jun. 9, 2014   (JP) .................................. 2014-118910

(51) Int. Cl.
*B60L 11/18*   (2006.01)
*H01M 8/04*   (2006.01)

(52) U.S. Cl.
CPC ......... *B60L 11/1883* (2013.01); *B60L 11/1885* (2013.01); *H01M 8/04201* (2013.01); *H01M 8/04649* (2013.01); *H01M 8/04753* (2013.01); *H01M 2250/20* (2013.01)

(58) Field of Classification Search
CPC ........... B60L 11/1883; B60L 11/1885; H01M 8/04201; H01M 8/04753; H01M 8/04649; H01M 2250/20
See application file for complete search history.

(56) References Cited

U.S. PATENT DOCUMENTS

| | | | | |
|---|---|---|---|---|
| 2003/0106726 A1* | 6/2003 | Yoshii | ...................... | B60K 6/26 180/65.1 |
| 2003/0180583 A1* | 9/2003 | Ichikawa | ............. | B60L 11/1885 429/9 |
| 2009/0027006 A1* | 1/2009 | Vezzini | ................. | H02J 7/0014 320/118 |
| 2013/0149628 A1* | 6/2013 | Ogawa | .............. | H01M 8/04492 429/450 |

FOREIGN PATENT DOCUMENTS

| | | |
|---|---|---|
| JP | 2001-351667 | 12/2001 |
| JP | 2011-033068 | 2/2011 |

* cited by examiner

*Primary Examiner* — James Trammell
*Assistant Examiner* — James E Stroud
(74) *Attorney, Agent, or Firm* — Mori & Ward, LLP

(57) ABSTRACT

A fuel-cell vehicle includes a storage container, a fuel cell system, a state detector, a transmitter, a request detector, and a controller. The controller includes a signal generator and a communication starting device. The signal generator is configured to determine a transmission value indicating a physical state detected by the state detector so as to generate a data signal in accordance with the transmission value. The signal generator is configured to set the transmission value to a reference value preset based on the physical state detected by the state detector if the fuel cell system is not running and configured to set the transmission value to a value obtained by correcting the reference value so that an amount of the fuel gas to be monitored by an external filling device increases if the fuel cell system is running.

12 Claims, 5 Drawing Sheets

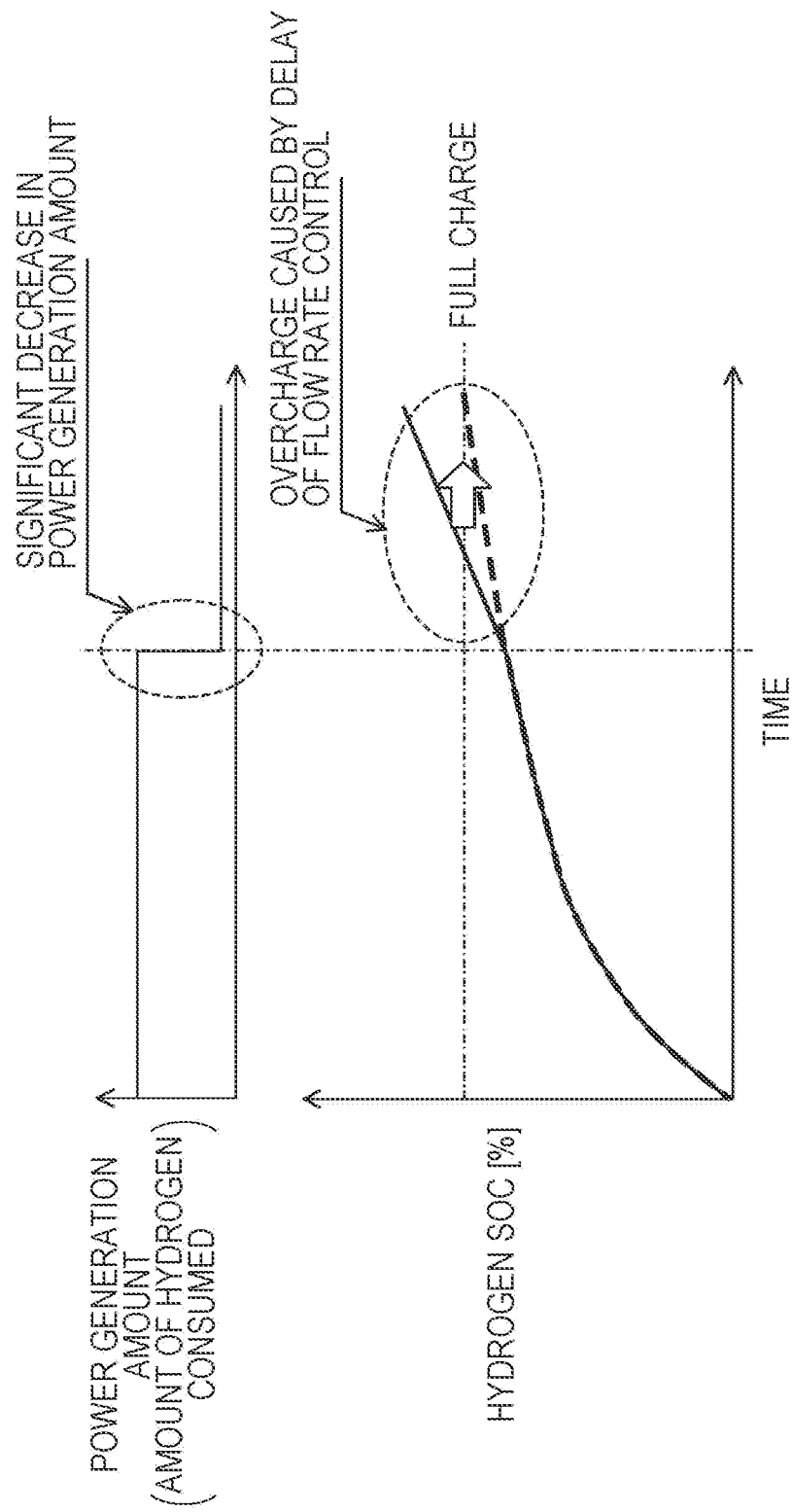

FUEL-CELL VEHICLE

CROSS-REFERENCE TO RELATED APPLICATIONS

The present application claims priority under 35 U.S.C. §119 to Japanese Patent Application No. 2014-118910, filed Jun. 9, 2014, entitled "Fuel-Cell Vehicle." The contents of this application are incorporated herein by reference in their entirety.

BACKGROUND

1. Field

The present disclosure relates to a fuel-cell vehicle.

2. Description of the Related Art

Fuel-cell vehicles include a fuel cell system that serves as a power supply system of the fuel-cell vehicle. A fuel cell generates electricity when receiving hydrogen gas serving as fuel gas and air serving as oxidant gas. The fuel-cell vehicles further include a hydrogen tank that stores hydrogen gas to be used by the fuel cell to generate electricity. Users fill the vehicles with hydrogen gas required for generating electric power at a hydrogen filling station.

In recent years, research and development on filling a hydrogen tank with hydrogen gas have become increasingly popular. For example, Japanese Unexamined Patent Application Publication No. 2011-33068 describes the following technique. That is, when a hydrogen filling device installed at a hydrogen filling station is connected to a fuel-cell vehicle to fill the hydrogen tank with hydrogen gas, the vehicle sends a data signal indicating the temperature and the pressure of the hydrogen tank to the station. The station monitors the state of the hydrogen tank (e.g., the hydrogen density) that is being filled with hydrogen gas on the basis of the data signal received from the vehicle and detection signals of sensors mounted in the station. Thus, the station completes supplying the hydrogen gas at an appropriate timing so that the tank is filled up. As used herein, such a technique for supplying hydrogen gas to fill the tank while performing communication is referred to as "communication filling". In addition, a technique for supplying hydrogen gas to fill the tank without performing communication is referred to as "non-communication filling".

As described in Japanese Unexamined Patent Application Publication No. 2001-351667, in general, existing fuel-cell vehicles do not allow the users to charge hydrogen gas into vehicles with the fuel cell system running (i.e., during the hydrogen gas in the hydrogen tank being consumed). However, in some cases, when the vehicle is being charged with the hydrogen gas and if the user powers on an air conditioner of the vehicle, the fuel cell system is started and, thus, the charging operation is stopped. Accordingly, in recent years, a demand for charging hydrogen gas into a vehicle even when the fuel cell system is running has been on the rise.

SUMMARY

According to one aspect of the present invention, a fuel-cell vehicle includes a storage container, a fuel cell system, a state detection unit, a transmitter, a request detecting unit, and a control unit. The storage container stores fuel gas charged by an external filling device. The fuel cell system supplies the fuel gas stored in the storage container to a fuel cell and causes the fuel cell to generate electricity. The fuel-cell vehicle travels using the fuel cell as a power source. The state detection unit detects a physical state regarding the storage container. The physical state is used for monitoring an amount of the fuel gas charged in the storage container. The transmitter transmits, to the external filling device, a data signal generated on the basis of a detection value output from the state detection unit. The request detecting unit generates a communication start request signal in response to a predetermined operation performed. The control unit controls the state detection unit, the transmitter, and the request detecting unit. The control unit includes a signal generating unit that determines a transmission value indicating the physical state on the basis of the detection value output from the state detection unit and generates a data signal in accordance with the transmission value and a communication starting unit that upon detecting the communication start request signal, enables the transmitter to transmit the data signal regardless of whether the fuel cell system is running. The signal generating unit sets the transmission value to a reference value preset on the basis of the detection value output from the state detection unit if the fuel cell system is not running and sets the transmission value to a value obtained by correcting the reference value so that the amount of fuel gas monitored by the external filling device increases if the fuel cell system is running.

According to another aspect of the present invention, a fuel-cell vehicle includes a storage container, a fuel cell system, a state detection unit, a transmitter, a request detecting unit, and a control unit. The storage container stores fuel gas charged by an external filling device. The fuel cell system supplies the fuel gas stored in the storage container to a fuel cell and causes the fuel cell to generate electricity. The fuel-cell vehicle travels using the fuel cell as a power source. The state detection unit detects a physical state regarding the storage container. The physical state is used for monitoring an amount of the fuel gas charged in the storage container. The transmitter transmits, to the external filling device, data signal generated on the basis of at least a detection value output from the state detection unit. The request detecting unit generates a communication start request signal in response to a predetermined operation performed. The control unit controls the state detection unit, the transmitter, and the request detecting unit. The control unit includes a communication starting unit that upon detecting the communication start request signal, enables a signal to be transmitted regardless of whether the fuel cell system is running, a charge amount parameter calculating unit that calculates a value of a charge amount parameter corresponding to the amount of fuel gas, and a charge stop instructing unit that causes the transmitter to transmit a charge stop request signal to stop charge of the fuel gas or to stop transmission of the data signal if the value of the charge amount parameter reaches a target value indicating full charge. If the fuel cell system is running, the charge stop instructing unit sets the target value to a value that is lower than the target value set when the fuel cell system is not running.

According to further aspect of the present invention, a fuel-cell vehicle includes a storage container, a fuel cell system, a state detector, a transmitter, a request detector, and a controller. The storage container is to store fuel gas charged from an external filling device. The fuel cell system is to supply the fuel gas stored in the storage container to a fuel cell to generate electricity. The fuel-cell vehicle is to travel using the fuel cell as a power source. The state detector is configured to detect a physical state in the storage container to monitor an amount of the fuel gas charged in the storage container. The transmitter is configured to transmit a data signal generated based on the physical state detected by the state detector to the external filling device. The request detector is configured to generate a communication start request signal in response to a predetermined operation performed. The controller includes a signal generator and a communication starting device. The signal generator is configured to determine a transmission value indicating the physical state detected by the state detector so as to generate the data signal in accordance with the transmission value. The signal generator is configured to set the transmission value to a reference value preset based on the physical state detected by the state detector if the fuel cell system is not running and configured to set the transmission value to a value obtained by correcting the reference value so that the amount of the fuel gas to be monitored by the external filling device increases if the fuel cell system is running. The communication starting device is configured to enable the transmitter to transmit the data signal regardless of whether the fuel cell system is running upon detecting the communication start request signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a schematic illustration of variations in the power generation amount of a fuel cell and hydrogen SOC of a hydrogen tank during communication filling.

DESCRIPTION OF THE EMBODIMENTS

Figure 1:
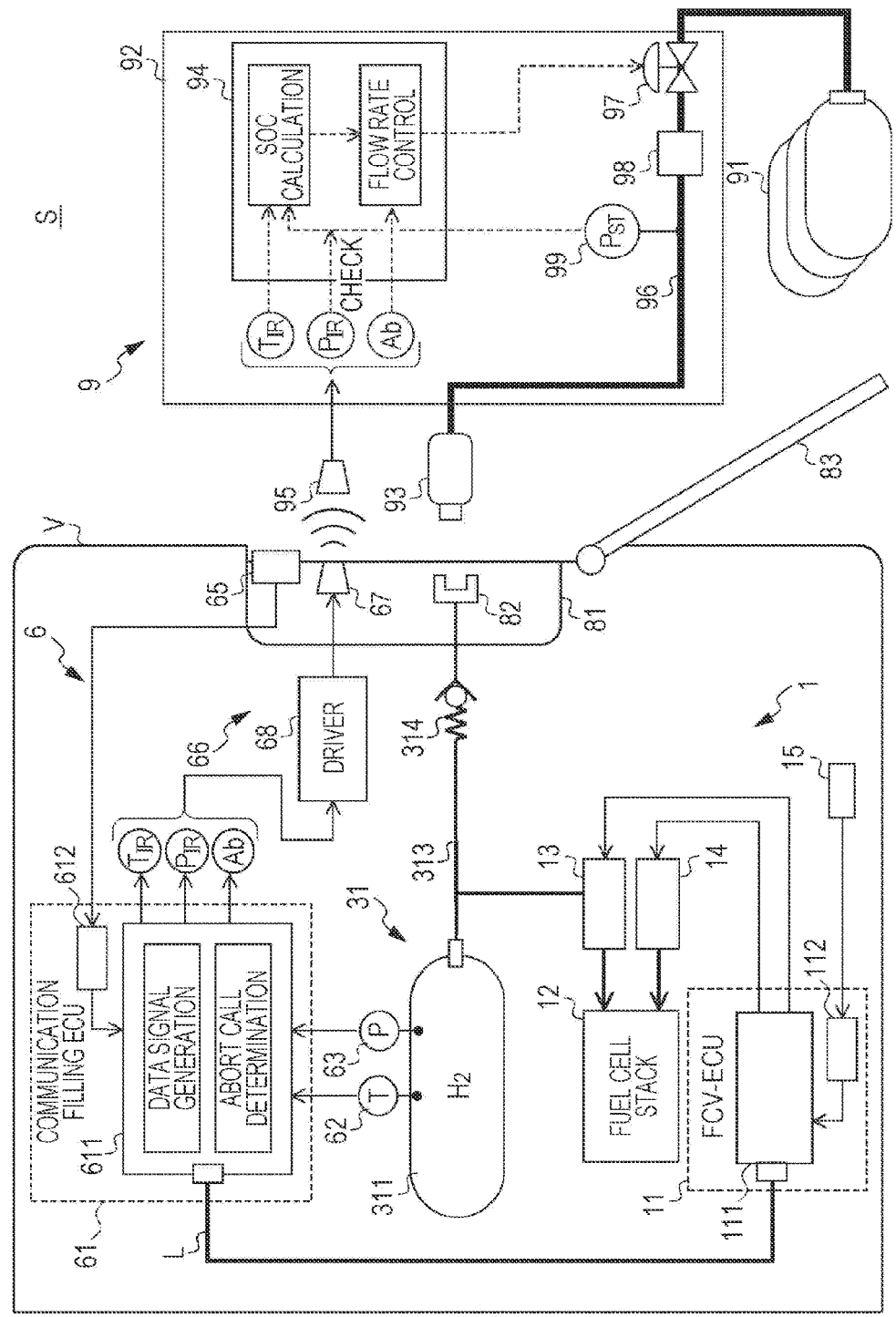
FIG. 1 illustrates the configuration of a hydrogen filling system including a fuel-cell vehicle according to a first exemplary embodiment of the present disclosure.

The embodiments will now be described with reference to the accompanying drawings, wherein like reference numerals designate corresponding or identical elements throughout the various drawings.

First Exemplary Embodiment

A first exemplary embodiment of the present disclosure is described below with reference to the accompanying drawings. FIG. 1 illustrates the configuration of a hydrogen filling system S including a fuel-cell vehicle V according to the present exemplary embodiment. The hydrogen filling system S includes the fuel-cell vehicle V that travels using hydrogen gas as fuel gas and a hydrogen filling station 9 that pumps hydrogen gas into a hydrogen tank 31 of the fuel-cell vehicle V.

The configuration of the hydrogen filling station 9 is described first. The hydrogen filling station 9 includes a hydrogen storage tank 91 storing high-pressure hydrogen gas and a dispenser 92 operated by the user to fill the fuel-cell vehicle V with the hydrogen gas supplied from the hydrogen storage tank 91. The hydrogen gas stored in the hydrogen storage tank 91 may be hydrogen gas evaporated from liquid hydrogen, hydrogen gas produced by reforming a material by a reforming apparatus, or hydrogen gas acquired by compressing hydrogen gas generated by an electrolytic apparatus using a compressor.

When a filling nozzle 93 of the dispenser 92 is inserted into a hydrogen inlet 82 provided in the fuel-cell vehicle V, the dispenser 92 decreases the pressure of the hydrogen gas supplied from the hydrogen storage tank 91 via the hydrogen supply pipe 96 to a predetermined charge pressure and supplies the hydrogen gas through the filling nozzle 93. The hydrogen supplied through the filling nozzle 93 is charged into the hydrogen tank 31 of the fuel-cell vehicle V.

The hydrogen supply pipe 96 includes the following devices that control the charge pressure. That is, the hydrogen supply pipe 96 includes a flow rate control valve 97 that controls the flow rate of hydrogen gas, a cooling unit 98 that cools the hydrogen gas, a station-side pressure sensor 99 that detects the pressure in the hydrogen supply pipe 96, and a station-side control unit 94 that opens and closes the flow rate control valve 97. The station-side pressure sensor 99 detects the pressure in a section of the supply pipe 96 downstream of the cooling unit 98 and sends, to the station-side control unit 94, a detection signal that is substantially proportional to a detection value $P_{ST}$. Since as described above, the station-side pressure sensor 99 is disposed in a portion of the hydrogen supply pipe 96 that is adjacent to the filling nozzle 93, the pressure detected by the station-side pressure sensor 99 during charge is substantially the same as the pressure inside the hydrogen tank 31 of the fuel-cell vehicle V.

The filling nozzle 93 includes an infrared communication device 95 that is used for communication filling. When the filling nozzle 93 is inserted into the hydrogen inlet 82, the infrared communication device 95 can receive an infrared signal from a communication filling system 6 (described in more detail below) mounted in the fuel-cell vehicle V.

The station-side control unit 94 has at least two functions: an SOC calculating function and a charging flow rate control function. The SOC calculating function calculates a hydrogen SOC value of the hydrogen tank 31 on the basis of a data signal that relates to the state of the hydrogen tank 31 of the fuel-cell vehicle V and that is received by the infrared communication device 95 during the communication filling (i.e., a signal including information regarding a pressure transmission value $P_{IR}$ and a temperature transmission value $T_{IR}$ described below) and a detection signal output from the station-side pressure sensor 99 (a signal that is substantially proportional to the pressure detection value $P_{ST}$). The charging flow rate control function controls the charging flow rate of the hydrogen gas during charging of the hydrogen gas.

The hydrogen SOC calculating function of the station-side control unit 94 is described below. The station-side control unit 94 acquires the temperature transmission value $T_{IR}$, the pressure transmission value $P_{IR}$, and the detection value $P_{ST}$ output from the station-side pressure sensor 99 and calculates the hydrogen SOC of the hydrogen tank 31 using these values as parameters for a predetermined algorithm. For example, the station-side control unit 94 compares the pressure transmission value $P_{IR}$ with the detection value $P_{ST}$ and calculates the value of the hydrogen SOC using the larger one of the pressure transmission value $P_{IR}$ and the detection value $P_{ST}$. In this manner, the calculated hydrogen SOC is overestimated at all times and, thus, overcharge can be prevented.

The charging flow rate control function of the station-side control unit 94 is described below. As the hydrogen gas is charged from the hydrogen filling station 9 into the hydrogen tank 31 more, the hydrogen SOC of the hydrogen tank 31 increases and, in addition, the internal pressure of the hydrogen tank 31 (and the pressure in the hydrogen supply pipe 96) increases. The station-side control unit 94 controls the valve position of the flow rate control valve 97 so that the detection value $P_{ST}$ output from the station-side pressure sensor 99 increases in a predetermined manner. In addition, the station-side control unit 94 compares the value of the hydrogen SOC calculated in the above-described manner with a predetermined full charge threshold value set for determining full charge during communication filling. If the value of the hydrogen SOC exceeds the full charge threshold value, the station-side control unit 94 determines that the hydrogen tank 31 is under full charge. Thus, the station-side control unit 94 closes the flow rate control valve 97 and completes the communication filling.

If the station-side control unit 94 cannot receive the data signal via the infrared communication device 95 during the communication filling or if the station-side control unit 94 receives an abort signal via the infrared communication device 95, the station-side control unit 94 suspends or completes the communication filling even when the hydrogen SOC has not yet reached the full charge threshold value. Hereinafter, the function of suspending or completing the communication filling in response to a predetermined request received form the fuel-cell vehicle V is referred to as an "abort function" performed by the hydrogen filling station 9.

The configuration of the fuel-cell vehicle V is described next. The fuel-cell vehicle V includes the communication filling system 6 that performs communication filling together with the hydrogen filling station 9 and the fuel cell system 1 that generates electricity using a fuel cell.

The fuel cell system 1 includes a fuel cell stack 12, a hydrogen gas supply device 13, an air compressor 14, an ignition switch 15, the hydrogen tank 31, and an electronic control unit 11 (hereinafter referred to as an "FCV-ECU") that controls these elements.

The fuel cell stack 12 (hereinafter simply referred to as a "stack") has a stack structure in which for example, several tens to several hundreds of cells are stacked. Each of the fuel cells has a membrane electrode assembly (MEA) sandwiched by two separators. The membrane electrode assembly includes an anode electrode (a negative electrode), a cathode electrode (a positive electrode), and a solid polymer electrolyte membrane sandwiched by the two electrodes. In general, the two electrodes are formed from a catalyst layer that is in contact with a solid polymer electrolyte membrane and that drives oxidation-reduction reaction and a gas diffusion layer that is in contact with the catalyst layer. When the hydrogen gas is provided into an anode passage formed in the stack 12 on the anode-electrode side and, at the same time, the air containing oxygen is provided into a cathode passage formed in the stack 12 on the cathode-electrode side, an electrochemical reaction takes place in the stack 12. Thus, electricity is generated.

The hydrogen gas supply device 13 includes a shutoff valve disposed in a passage extending from the hydrogen tank 31 to the stack 12, a regulator that decreases the high-pressure hydrogen gas discharged from the hydrogen tank 31 to an appropriate pressure, and an injector that supplies the hydrogen gas having a reduced pressure to the anode passage of the stack 12. The air compressor 14 compresses external air and supplies the compressed air to the cathode passage of the stack 12.

The ignition switch 15 is connected to the FCV-ECU 11. If the ignition switch 15 is turned on from off, the ignition switch 15 generates a start request signal for the fuel cell system 1. In contrast, if the ignition switch 15 is turned off from on, the ignition switch 15 generates a stop request signal for the fuel cell system 1.

The FCV-ECU 11 is an electronic control unit that controls a variety of devices that constitute the fuel cell system 1. The FCV-ECU 11 includes a microcomputer 111 that includes electronic circuits, such as a central processing unit (CPU), a read only memory (ROM), and a random access memory (RAM), and a variety of interfaces. The FCV-ECU 11 further includes a regulator 112 that supplies electricity from a battery (not illustrated) to the microcomputer 111.

Upon receiving the start request signal from the ignition switch 15, the regulator 112 starts supplying electricity to the microcomputer 111. Thus, the microcomputer 111 enters a mode in which the functions described below are activated.

Upon being started by the start request signal from the ignition switch 15, the microcomputer 111 drives the air compressor 14 and the hydrogen gas supply device 13. Thus, air and the hydrogen gas stored in the hydrogen tank 31 are provided to the stack 12, which generates electricity. In this manner, the fuel cell system 1 is started. In addition, upon receiving the stop request signal from the ignition switch 15, the microcomputer 111 performs a system halt process as needed. Thereafter, the microcomputer 111 stops the fuel cell system 1. In this manner, the fuel cell system 1 is halted.

The system halt process is performed to prevent deterioration of the stack 12 and discharge water remaining in the stack 12. In the system halt process, the hydrogen gas in the hydrogen tank 31 is used as needed. The system halt process is performed in accordance with the mode of the stack 12 and an external air environment when the stop request signal is detected.

The microcomputer 111 further includes an electric current sensor (not illustrated) that detects an electric current generated by the stack 12. The microcomputer 111 calculates the power generation amount generated by the stack 12 or the amount of hydrogen gas consumed by the stack 12 on the basis of a detection value output from the electric current sensor.

In addition, the microcomputer 111 and a computer 611 of a communication filling ECU 61 (described in more detail below) are connected to each other using a communication line L. The microcomputer 111 and the computer 611 can communicate data with each other through CAN communication (note that according to the present disclosure, the communication is not limited to CAN communication). The microcomputer 111 can acquire information acquired by the computer 611 (e.g., information output from a tank temperature sensor 62 and a tank pressure sensor 63 described below).

The hydrogen tank 31 includes a tank body 311 that stores high-pressure hydrogen gas charged from the hydrogen filling station 9, a hydrogen inlet pipe 313 extending from the tank body 311 to the hydrogen inlet 82, and a gas check valve 314 disposed in the hydrogen inlet pipe 313. The hydrogen inlet 82 is provided inside a lid box 81 located at the side rear of the fuel-cell vehicle V. The lid box 81 has a lid 83 pivotably disposed. At the hydrogen filling station 9, the user opens the lid 83 to expose the hydrogen inlet 82 to the outside. Thereafter, the user inserts the filling nozzle 93 of the dispenser 92 into the hydrogen inlet 82 to charge hydrogen gas into the hydrogen tank 31.

The communication filling system 6 includes the tank temperature sensor 62, the tank pressure sensor 63, a lid sensor 65, an infrared transmitter 66, and the electronic control unit (the communication filling ECU) 61 that controls these sensors and transmitter.

The tank temperature sensor 62 detects the temperature of the hydrogen gas inside, for example, the tank body 311 among the temperatures inside the parts of the hydrogen tank 31 and sends, to the communication filling ECU 61, a detection signal that is substantially proportional to a detection value T. The tank pressure sensor 63 detects the pressure of the hydrogen gas inside, for example, the tank body 311 among the pressures inside the parts of the hydrogen tank 31 and sends, to the communication filling ECU 61, a detection signal that is substantially proportional to a detection value P. The temperature and pressure inside the hydrogen tank 31 are the physical states required for detecting the hydrogen SOC of the hydrogen tank 31.

The lid sensor 65 is disposed in the lid box 81. The lid sensor 65 detects whether the lid 83 is open or closed. If the user opens the lid 83 to charge the hydrogen gas, the lid sensor 65 sends an open signal to the communication filling ECU 61. In contrast, if the user closes the lid 83, the lid sensor 65 sends a closed signal to the communication filling ECU 61.

As described above, to charge the hydrogen gas into the hydrogen tank 31, the user needs to open the lid 83. Accordingly, the lid 83 is made open or closed before starting or completing charging the hydrogen gas at all times. Thus, hereinafter, the open signal output from the lid sensor 65 is also referred to as a "communication start request signal" sent to the communication filling system 6. In addition, the closed signal output from the lid sensor 65 is also referred to as a "communication completion request signal" sent to the communication filling system 6.

The infrared transmitter 66 includes an infrared LED 67 and a driver 68 that drives the infrared LED 67. The driver 68 causes the infrared LED 67 to blink in accordance with a data signal or an abort signal generated by the communication filling ECU 61 (the data signal and the abort signal are described in more detail below). In this manner, the infrared transmitter 66 sends the data signal or the abort signal generated by the communication filling ECU 61 to the infrared communication device 95 of the hydrogen filling station 9 in the form of an infrared blink signal. Hereinafter, communication performed between the infrared transmitter 66 of the fuel-cell vehicle V and the infrared communication device 95 of the hydrogen filling station 9 is referred to as "IR communication".

The communication filling ECU 61 is an electronic control unit that controls a variety of devices that constitute the communication filling system 6. The communication filling ECU 61 includes a microcomputer 611 that includes electronic circuits, such as a CPU, a ROM, and a RAM, and a variety of interfaces. The communication filling ECU 61 further includes a regulator 612 that supplies electricity from a battery (not illustrated) to the microcomputer 611 and the infrared transmitter 66.

Upon receiving the communication start request signal from the lid sensor 65, the regulator 612 starts supplying electricity to the microcomputer 611 and the driver 68 of the infrared transmitter 66 regardless of whether the fuel cell system 1 is running. Thus, the microcomputer 611 enters a mode in which the functions described below are activated, and the infrared transmitter 66 can send the data signal or the abort signal.

The microcomputer 611 has at least two functions: a transmission data signal generating function and an abort call determination function. The transmission data signal generating function generates a data signal indicating the physical state of the hydrogen tank 31 on the basis of the detection signals output from the tank temperature sensor 62 and the tank pressure sensor 63. The abort call function stops charging of the hydrogen gas into the hydrogen tank 31 using the abort call function of the hydrogen filling station 9.

In addition, as described above, the microcomputer 611 can communicate data with the microcomputer 111 of the FCV-ECU 11 through CAN communication. Accordingly, the microcomputer 611 can acquire, for example, information as to whether the fuel cell system 1 is running, the power generation amount of the stack 12, and the amount of the hydrogen gas consumed by the stack 12. The transmission data signal generating function and the abort call determination function of the microcomputer 611 are described in detail below.

Figure 2:
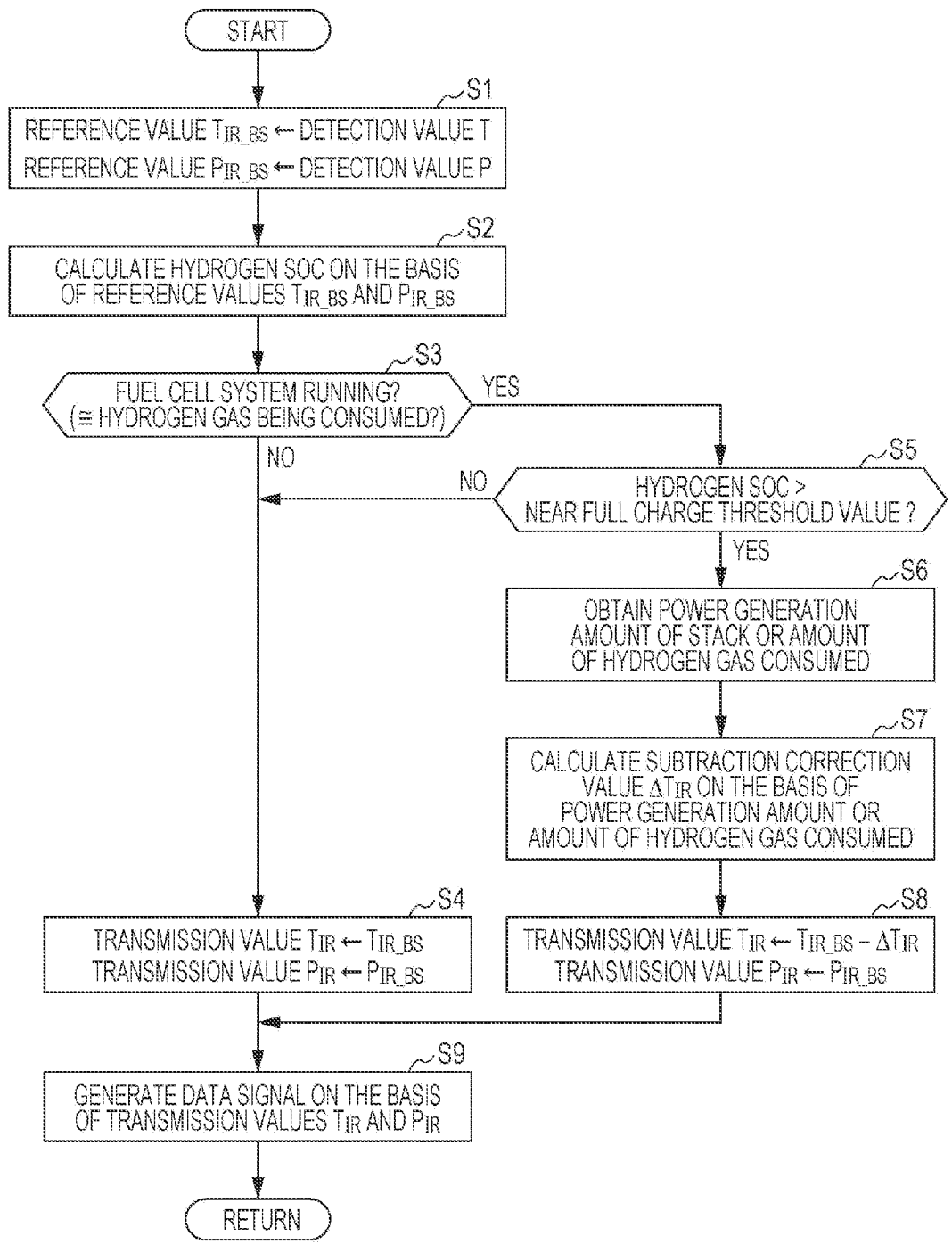
FIG. 2 is a flowchart of the procedure for generating a data signal to be transmitted through IR communication in the fuel-cell vehicle according to the first exemplary embodiment.

FIG. 2 is a flowchart of the procedure for generating a data signal to be transmitted through IR communication. The process illustrated in FIG. 2 is repeatedly performed by the microcomputer 611 during the communication filling.

In step S1, the microcomputer 611 acquires the detection value T output from the tank temperature sensor and the detection value P output from a tank pressure sensor and defines the detection value T and the detection value P as a transmission reference value $T_{IR\_BS}$ and a transmission reference value $P_{IR\_BS}$, respectively. In step S2, the microcomputer 611 calculates the value of the hydrogen SOC using the transmission reference values $T_{IR\_BS}$ and $P_{IR\_BS}$ as parameters for a predetermined algorithm.

In step S3, the microcomputer 611 determines whether the fuel cell system 1 is running using, for example, CAN communication, that is, whether the hydrogen gas in the hydrogen tank 31 is being consumed. If the determination is NO, the processing proceeds to step S4, where the microcomputer 611 sets the transmission values $T_{IR}$ and $P_{IR}$ to the transmission reference values $T_{IR\_BS}$ and $P_{IR\_BS}$ calculated in step S1, respectively.

However, if the determination made in step S3 is YES, the processing proceeds to step S5, where the microcomputer 611 determines whether the hydrogen tank 31 is almost full. More specifically, the microcomputer 611 determines whether the value of the hydrogen SOC calculated in step S2 exceeds a near full charge threshold value that is slightly lower than a full charge threshold value set for determining the full charge. If the determination made in step S5 is NO, the processing proceeds to step S4, where as described above, the microcomputer 611 sets the transmission values $T_{IR}$ and $P_{IR}$ to the transmission reference values $T_{IR\_BS}$ and $P_{IR\_BS}$, respectively.

However, if the determination made in step S5 is YES, the processing proceeds to step S6, where the microcomputer 611 obtains the power generation amount of the stack 12 or the amount of the hydrogen gas consumed by the stack 12. In step S7, the microcomputer 611 calculates a positive subtraction correction value $\Delta T_{IR}$ to be applied to a temperature transmission reference value $T_{IR\_BS}$ in accordance with the power generation amount or the amount of the hydrogen gas consumed obtained in step S6. The subtraction correction value $\Delta T_{IR}$ is set so as to increase with increasing power generation amount or increasing amount of hydrogen gas consumed. That is, the transmission values $T_{IR}$ is corrected more largely from the temperature transmission reference value $T_{IR\_BS}$ with increasing power generation amount or the amount of hydrogen gas consumed.

In step S8, the microcomputer 611 sets the pressure transmission value $P_{IR}$ to a pressure transmission reference value $P_{IR\_BS}$. In addition, in step S8, the microcomputer 611 sets the temperature transmission value $T_{IR}$ to a value obtained by subtracting the subtraction correction value $\Delta T_{IR}$ from the temperature transmission reference value $T_{IR\_BS}$ so that the hydrogen SOC monitored by the station increases. In step S9, the microcomputer 611 generates data signals corresponding to the calculated temperature transmission value $T_{IR}$ and pressure transmission value $P_{IR}$.

Referring back to FIG. 1, the abort call determination function performed by the microcomputer 611 is described. As described above, the hydrogen filling station 9 has an abort function. That is, upon receiving an abort signal during communication filling or losing the data signals received during the communication filling, the hydrogen filling station 9 completes or suspends the communication filling currently in execution. If a predetermined condition set for preventing overcharge of hydrogen gas or overheating of the hydrogen tank 31 during the communication filling is satisfied, the microcomputer 611 generates an abort signal and sends the abort signal from the infrared transmitter 66 or forcibly stops transmission of the data signal from the infrared transmitter 66. Hereinafter, such an operation is referred to as an "abort action". In this manner, the communication filling in execution is completed or suspended. More specifically, if the detection value T output from the tank temperature sensor exceeds an overheating prevention threshold value $T_{max}$ set for preventing overheating of the hydrogen tank 31, if the detection value P output from the tank pressure sensor exceeds an overcharge prevention threshold value $P_{max}$, or if the value of the hydrogen SOC calculated on the basis of the detection values T or P exceeds a predetermined target value that indicates full charge, the microcomputer 611 performs the above-described abort action. Note that in addition to the above-described conditions, the abort action may be performed if at least one of the tank temperature sensor and the tank pressure sensor malfunctions during the communication filling.

Second Exemplary Embodiment

A second exemplary embodiment of the present disclosure is described below with reference to the accompanying drawings. In the following description, the same reference numeral will be used to designate an element that is the same as in the first exemplary embodiment, and detailed description of the element is not repeated. In a fuel-cell vehicle according to the present exemplary embodiment, the data signal generating function performed by a computer of a communication filling ECU differs from that of the fuel-cell vehicle according to the first exemplary embodiment.

Figure 3:
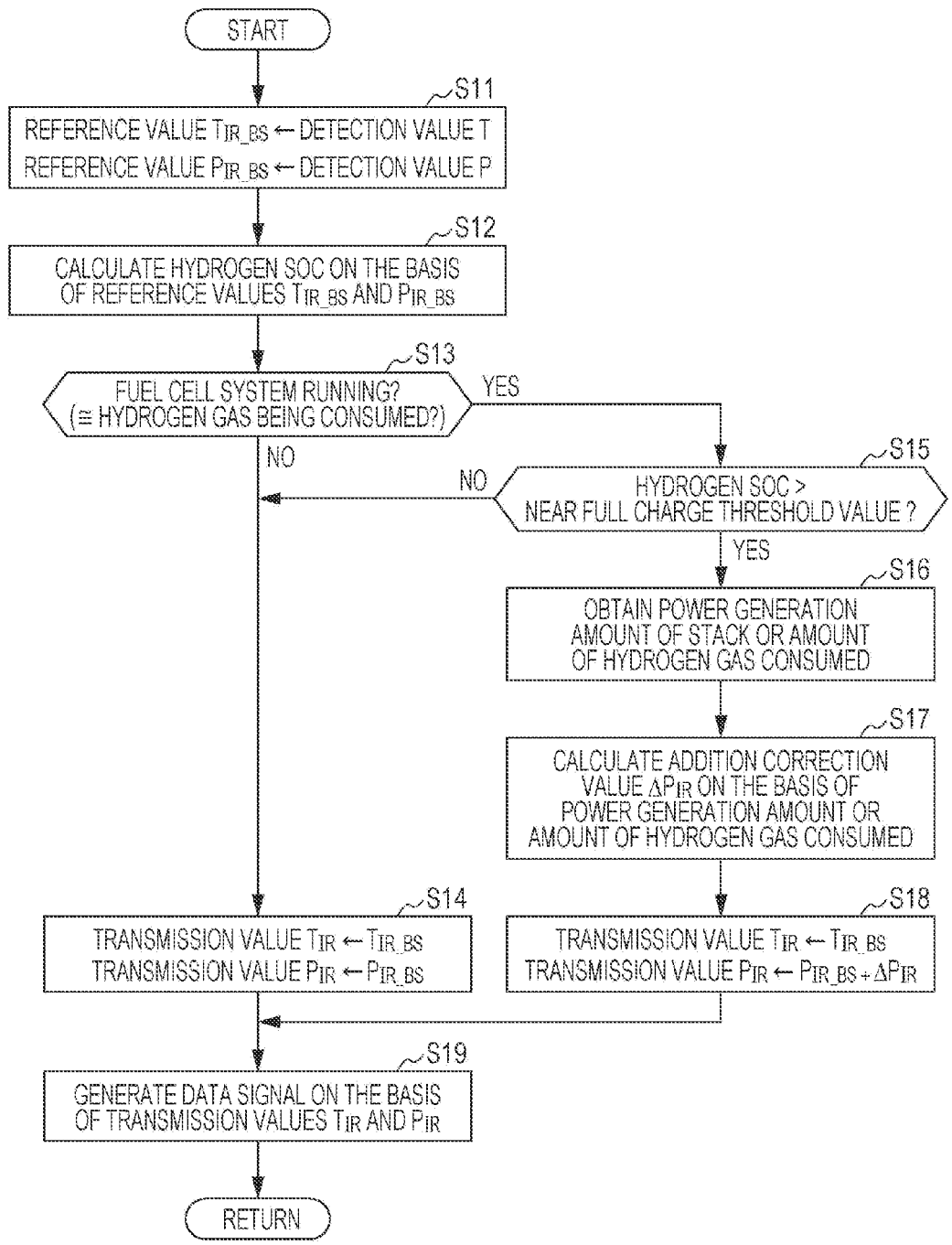
FIG. 3 is a flowchart of the procedure for generating a data signal to be transmitted through IR communication in a fuel-cell vehicle according to a second exemplary embodiment of the present disclosure.

FIG. 3 is a flowchart of the procedure for generating a data signal to be transmitted through IR communication in the fuel-cell vehicle according to the present exemplary embodiment. The process illustrated in FIG. 3 is repeatedly performed by the computer of the communication filling ECU during the communication filling. Note that the processes performed in steps S11 to S16 and step S19 in FIG. 3 are the same as those performed in steps S1 to S6 and step S9 in FIG. 2, respectively. Accordingly, detailed description of the processes is not repeated. Unlike the process in FIG. 2 in which the temperature of the hydrogen tank is corrected while the fuel cell system is running, the pressure of the hydrogen tank is corrected while the fuel cell system is running in the process in FIG. 3.

In step S17, the computer calculates a positive addition correction value $\Delta P_{IR}$ to be applied to the pressure transmission reference value $P_{IR\_BS}$ in accordance with the power generation amount or the amount of hydrogen gas consumed obtained in step S16. The addition correction value $\Delta P_{IR}$ is set so as to increase with increasing power generation amount or the amount of hydrogen gas consumed. That is, the transmission values $P_{IR}$ is corrected more largely from the pressure transmission reference value $P_{IR\_BS}$ with increasing power generation amount or the amount of hydrogen gas consumed. In step S18, the computer sets the temperature transmission value $T_{IR}$ to the temperature transmission reference value $T_{IR\_BS}$. In addition, in step S18, the computer sets the pressure transmission value $P_{IR}$ to a value obtained by adding the addition correction value $\Delta P_{IR}$ to the pressure transmission reference value $P_{IR\_BS}$ so that the hydrogen SOC monitored by the station increases. In step S19, the computer generates data signals corresponding to the calculated temperature transmission value $T_{IR}$ and pressure transmission value $P_{IR}$.

In the above-described first exemplary embodiment, if the fuel cell system is running, the temperature transmission reference value $T_{IR\_BS}$ is corrected so that the hydrogen SOC is estimated to be lower than the actual hydrogen SOC at the station. Thus, the communication filling is completed earlier than the completion time based on the actual hydrogen SOC. In contrast, according to the present exemplary embodiment, as illustrated in FIG. 3, when the fuel cell system is running, the pressure transmission reference value $P_{IR\_BS}$ is corrected so that the hydrogen SOC is estimated to be higher than the actual hydrogen SOC at the station. Thus, the communication filling is completed earlier than the completion time based on the actual hydrogen SOC. Accordingly, unlike the first exemplary embodiment, in the present exemplary embodiment, the need for correcting the temperature transmission reference value $T_{IR\_BS}$ is eliminated. Note that the present exemplary embodiment may be still combined with the first exemplary embodiment.

Third Exemplary Embodiment

A third exemplary embodiment of the present disclosure is described below with reference to the accompanying drawings. In the following description, the same reference numeral will be used to designate an element that is the same as in the first exemplary embodiment, and detailed description of the element is not repeated. In a fuel-cell vehicle according to the present exemplary embodiment, the data signal generating function and the abort call determination function performed by a computer of a communication filling ECU differ from those of the fuel-cell vehicle according to the first exemplary embodiment.

Figure 4:
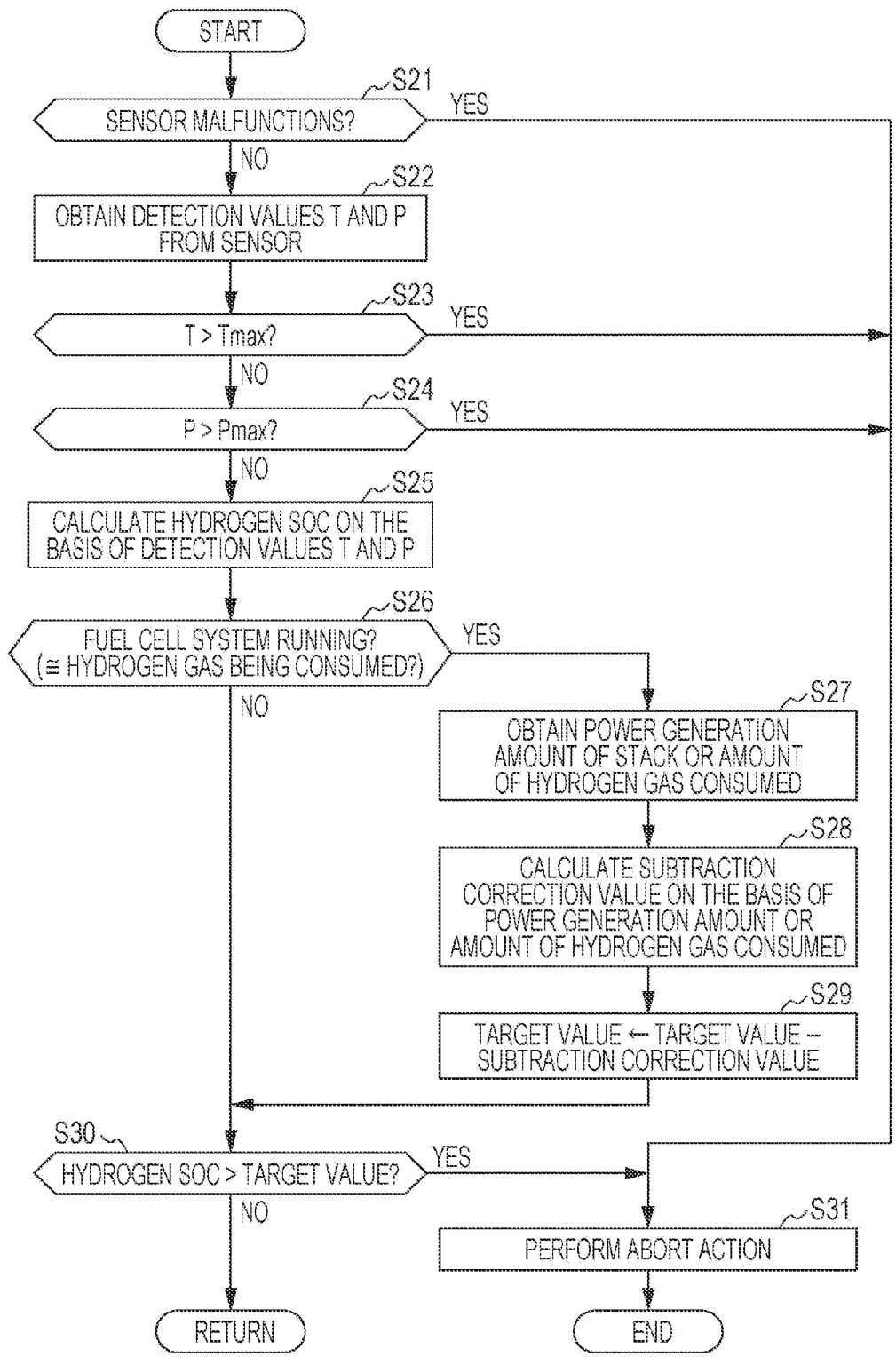
FIG. 4 is a flowchart of the procedure for generating a data signal to be transmitted through IR communication in a fuel-cell vehicle according to a third exemplary embodiment of the present disclosure.

The abort call determination function performed by the computer of the communication filling ECU is described first. FIG. 4 is a flowchart of the procedure for determining the timing at which the abort action is performed in the fuel-cell vehicle according to the present exemplary embodiment. The process illustrated in FIG. 4 is repeatedly performed by the computer of the communication filling ECU during the communication filling.

In step S21, the computer determines whether one of the tank temperature sensor and the tank pressure sensor malfunctions. If the determination made in step S21 is NO, the processing proceeds to step S22, where the computer obtains the detection value T output from the tank temperature sensor and the detection value P output from the tank pressure sensor. In step S23, the computer determines whether the temperature detection value T exceeds a predetermined overheating prevention threshold value $T_{max}$. If the determination made in step S23 is NO, the processing proceeds to step S24, where the computer determines whether the pressure detection value P exceeds a predetermined overcharge prevention threshold value $P_{max}$. If the determination made in step S24 is NO, the processing proceeds to step S25.

In step S25, the computer calculates the hydrogen SOC of the hydrogen tank based on the detection values T and P using a predetermined algorithm. In step S26, the computer determines whether the fuel cell system is running, that is, whether the hydrogen tank in the hydrogen gas is being consumed by the stack using, for example, CAN communication. If the determination made in step S26 is NO, the processing proceeds to step S30. However, if the determination made in step S26 is YES, the processing proceeds to step S27.

In step S27, the computer obtains the power generation amount of the stack or the amount of hydrogen gas consumed by the stack through, for example, CAN communication. In step S28, the computer calculates a subtraction correction value to be applied to the target value of the hydrogen SOC in accordance with the power generation amount or the amount of hydrogen gas consumed obtained in step S27. The subtraction correction value is set so as to increase with increasing power generation amount or increasing amount of hydrogen gas consumed and, thus, the target value decreases.

In step S29, the computer redefines a value obtained by subtracting the subtraction correction value from a preset target value as a new target value. In step S30, the computer determines whether the value of the hydrogen SOC calculated in step S25 exceeds the target value. If the determination made in step S30 is NO, the processing is completed immediately. However, if any one of the determinations made in steps S21, S23, S24, and S30 is YES, the abort action (one of completion of transmission of the data signal and transmission of the abort signal) is performed. Thereafter, the processing is completed.

The data signal generating function performed by the computer of the communication filling ECU is described next. In the above-described first and second exemplary embodiments, if the fuel cell system is running, the temperature transmission reference value $T_{IR\_BS}$ or the pressure transmission reference value $P_{IR\_BS}$ is corrected so that the hydrogen SOC is estimated to be higher than the actual hydrogen SOC at the station. Thus, the communication filling is completed earlier than the completion time based on the actual hydrogen SOC. In contrast, according to the present exemplary embodiment, as illustrated in FIG. 4, if the fuel cell system is running, the target value for the hydrogen SOC calculated in the vehicle is corrected so as to decrease. Thus, the communication filling is completed earlier than the completion time based on the actual hydrogen SOC. Consequently, according to the present exemplary embodiment, unlike the above-described first and second exemplary embodiments, the need for correcting the temperature transmission reference value $T_{IR\_BS}$ and the pressure transmission reference value $P_{IR\_BS}$ can be eliminated. That is, according to the present exemplary embodiment, the detection value T output from the tank temperature sensor and the detection value P output from the tank pressure sensor can be directly used as the transmission values $T_{IR}$ and $P_{IR}$, respectively. Note that the present exemplary embodiment may be still combined with the first or second exemplary embodiment.

While three exemplary embodiments of the present disclosure have been described above, the present disclosure is not limited thereto. That is, when the fuel cell system is running, the three exemplary embodiments may be combined in an appropriate way in order to complete the communication filling reliably and earlier than in ordinary cases.

In addition, in the above-described first and second exemplary embodiments, the reference values are corrected when the fuel cell system is running and if the hydrogen SOC exceeds the near full charge threshold value. However, the technique of the present disclosure is not limited thereto (refer to step S5 in FIG. 2 and step S15 in FIG. 3). The hydrogen SOC of the hydrogen tank increases with increasing pressure of the hydrogen tank. Accordingly, the reference values may be corrected when the fuel cell system is running and if the detection value P exceeds a threshold value set to a value slightly lower than a predetermined threshold value set for determining full charge.

In addition, in the above-described first and second exemplary embodiments, the overcharge caused by the delay of the charging flow rate control performed at the station is prominent if the power generation amount of the stack or the amount of the hydrogen gas consumed by the stack significantly varies in the vicinity of a full charge point. Thus, the reference values are corrected if the hydrogen SOC exceeds the near full charge threshold value. However, the technique of the present disclosure is not limited thereto. For example, if the power generation amount of the stack or the amount of the hydrogen gas consumed by the stack actually varies to a value higher than a predetermined threshold value after the hydrogen SOC exceeds the near full charge threshold value, the reference value may be corrected.

In addition, in the above-described first to third exemplary embodiments, if the open signal is output from the lid sensor 65 disposed in the lid box 81, the microcomputer 611 of the communication filling ECU 61 and the infrared transmitter 66 are started. However, the technique of the present disclosure is not limited thereto. For example, if the filling nozzle 93 of the hydrogen filling station 9 is connected to the hydrogen inlet 82, the microcomputer 611 of the communication filling ECU 61 and the infrared transmitter 66 may be started. Alternatively, a button which the user can operate to allow start of the communication filling may be provided on the driver seat. If the button is operated, the microcomputer 611 of the communication filling ECU 61 and the infrared transmitter 66 may be started.

In addition, while the above first to third exemplary embodiments have been described with reference to the FCV-ECU 11 and the communication filling ECU 61 separated from each other, the configuration of the present disclosure is not limited thereto. The FCV-ECU 11 and the communication filling ECU 61 may be integrated into a single ECU.

In addition, while the above first to third exemplary embodiments have been described with reference to the abort action in which the infrared transmitter 66 sends the abort signal or transmission of the data signal from the infrared transmitter 66 is forcibly stopped, the abort action of the present disclosure is not limited thereto. For example, if communication of data signals is lost during the communication filling, some hydrogen filling stations switch from the communication filling to non-communication filling so as to continue to charge the hydrogen gas into the hydrogen tank. Accordingly, for such hydrogen filling stations having a charging method switching function, to stop charging, it is desirable to send an abort signal from an infrared transmitter of the vehicle. In addition, for hydrogen filling stations without the charging method switching function, to stop charging, an abort signal may be sent, as described above, or transmission of data signals may be stopped.

In addition, while the first to third exemplary embodiments have been described with reference to determination as to whether the fuel cell system is running using the CAN communication between the communication filling ECU and FCV-ECU (refer to, for example, step S3 in FIG. 2, step S13 in FIG. 3, and step S26 in FIG. 4), the determination technique of the present disclosure is not limited thereto. As described above, the determination as to whether the fuel cell system is running is made on the basis of whether the hydrogen gas in the hydrogen tank is consumed. Accordingly, determination as to whether the fuel cell system is running may be replaced with determination as to whether the hydrogen gas in the hydrogen tank is currently consumed. Note that the determination as to whether the hydrogen gas in the hydrogen tank is currently consumed can be made indirectly by using, for example, a flow rate sensor disposed in a hydrogen gas passage or a voltage sensor that detects the electromotive force of the stack.

FIG. 5 is a schematic illustration of variations of the power generation amount of a fuel cell and a hydrogen SOC of a hydrogen tank (the amount (or density) of hydrogen currently stored in the hydrogen tank/the maximum amount (or density) of hydrogen that can be charged into the hydrogen tank× 100(%)) during communication filling. In FIG. 5, a solid line represents a variation in the actual hydrogen SOC, and a dashed line represents the hydrogen SOC monitored by the station.

As illustrated in FIG. 5, if the power generation amount of the fuel cell, that is, the flow rate of the hydrogen gas retrieved from the hydrogen tank negligibly changes, the actual hydrogen SOC is substantially the same as the hydrogen SOC monitored by the station. In contrast, in some cases (e.g., the case in which the user powers on the air conditioner), the power generation amount of the fuel cell significantly decreases during charging of the hydrogen tank and, thus, the flow rate of hydrogen gas retrieved from the hydrogen tank significantly decreases. At that time, as illustrated in FIG. 5, the hydrogen SOC monitored by the station differs from the actual hydrogen SOC. As a result, the station cannot stop supplying the hydrogen gas at an appropriate timing and, thus, overcharge of hydrogen gas occurs (more than a predetermined amount of hydrogen gas is charged into the hydrogen tank).

Note that if the fuel cell system is not stopped immediately after the ignition switch is turned off and, thus, electricity is continuously generated for a predetermined period of time or if the fuel cell system is automatically started at a predetermined timing regardless of the operation performed on the ignition switch, the hydrogen gas in the hydrogen tank may be consumed at a different timing from the above-described timing. Even in such a case, the processing currently being performed may be completed during the communication filling, and the amount of hydrogen gas consumed may be decreased, as illustrated in FIG. 5, and overcharge of hydrogen gas may occur.

(1) According to an aspect of the present disclosure, a fuel-cell vehicle (e.g., a fuel-cell vehicle V described below) includes a storage container (e.g., a hydrogen tank 31 described below) that stores fuel gas charged by an external filling device (e.g., a hydrogen filling station 9 described below), a fuel cell system (a fuel cell system 1 described below) that supplies the fuel gas stored in the storage container to a fuel cell (a fuel cell stack 12 described below) and causes the fuel cell to generate electricity, where the fuel-cell vehicle travels using the fuel cell as a power source, a state detection unit (e.g., a tank temperature sensor 62, a tank pressure sensor 63 described below) that detects a physical state regarding the storage container, where the physical state is used for monitoring an amount of the fuel gas charged in the storage container (e.g., a hydrogen SOC described below), a transmitter (e.g., an infrared transmitter 66 described below) that transmits, to the external filling device, a data signal generated on the basis of a detection value output from the state detection unit, a request detecting unit (e.g., a lid sensor 65 described below) that generates a communication start request signal in response to a predetermined operation performed, and a control unit (e.g., a communication filling ECU 61 described below) that controls the state detection unit, the transmitter, and the request detecting unit. The control unit includes a signal generating unit (e.g., a data signal generating function of a microcomputer 611 of the communication filling ECU 61 described below) that determines a transmission value ($T_{IR}$, $P_{IR}$) indicating the physical state on the basis of the detection value output from the state detection unit and generates a data signal in accordance with the transmission value and a communication starting unit (e.g., a regulator 612 of the communication filling ECU 61 described below) that upon detecting the communication start request signal, enables the transmitter to transmit the data signal regardless of whether the fuel cell system is running. The signal generating unit sets the transmission value to a reference value ($T_{IR\_BS}$, $P_{IR\_BS}$) preset on the basis of the detection value output from the state detection unit if the fuel cell system is not running and sets the transmission value to a value obtained by correcting the reference value ($T_{IR\_BS}-\Delta T_{IR}$, $P_{IR\_BS}+\Delta P_{IR}$) so that the amount of fuel gas monitored by the external filling device increases if the fuel cell system is running.

(2) In such a case, it is desirable that when the fuel cell system is running and if one of a pressure and the amount of fuel gas (e.g., a hydrogen SOC described below) inside the storage container is greater than or equal to a predetermined threshold value (e.g., a near full charge threshold value described below), the signal generating unit sets the transmission value to a value obtained by correcting the reference value so that the amount of fuel gas monitored by the external filling device increases.

(3) In such a case, it is desirable that the physical state represents a temperature of the storage container and the signal generating unit sets the transmission value to a corrected value that is lower than the reference value.

(4) In such a case, it is desirable that the physical state represents a pressure inside the storage container and the signal generating unit sets the transmission value to a corrected value that is higher than the reference value.

(5) In such a case, it is desirable that the signal generating unit increases a correction amount ($\Delta T_{IR}$, $\Delta P_{IR}$) applied to the reference value with increasing power generation amount of the fuel cell or increasing amount of the fuel gas consumed by the fuel cell.

(6) According to another aspect of the present disclosure, a fuel-cell vehicle (e.g., a fuel-cell vehicle V described below) includes a storage container (e.g., a hydrogen tank 31 described below) that stores fuel gas charged by an external filling device (e.g., a hydrogen filling station 9 described below), a fuel cell system (a fuel cell system 1 described below) that supplies the fuel gas stored in the storage container to a fuel cell (a fuel cell stack 12 described below) and causes the fuel cell to generate electricity, where the fuel-cell vehicle travels using the fuel cell as a power source, a state detection unit (e.g., a tank temperature sensor 62 or a tank pressure sensor 63 described below) that detects a physical state regarding the storage container, where the physical state is used for monitoring an amount of the fuel gas charged in the storage container (e.g., a hydrogen SOC described below), a transmitter (e.g., an infrared transmitter 66 described below) that transmits, to the external filling device, a data signal generated on the basis of at least a detection value output from the state detection unit, a request detecting unit (e.g., a lid sensor 65 described below) that generates a communication start request signal in response to a predetermined operation performed, and a control unit (e.g., a communication filling ECU 61 described below) that controls the state detection unit, the transmitter, and the request detecting unit. The control unit includes a communication starting unit (e.g., a regulator 612 of the communication filling ECU 61 described below) that upon detecting the communication start request signal, enables a signal to be transmitted regardless of whether the fuel cell system is running, a charge amount parameter calculating unit (e.g., a charge amount calculating function of the microcomputer 611 of the communication filling ECU 61 described below) that calculates a value of a charge amount parameter corresponding to the amount of fuel gas (e.g., a hydrogen SOC described below), and a charge stop instructing unit (e.g., an abort call determination function of the microcomputer 611 of the communication filling ECU 61 described below) that causes the transmitter to transmit a charge stop request signal to stop charge of the fuel gas or to stop transmission of the data signal if the value of the charge amount parameter reaches a target value indicating full charge. If the fuel cell system is running, the charge stop instructing unit sets the target value to a value that is lower than the target value set when the fuel cell system is not running.

The present application provides the following advantages: (1) If a user performs a predetermined operation to start charge of the fuel gas, the request detecting unit detects the operation and generates the communication start request signal. Upon detecting the communication start request signal, the control unit enables the transmitter to transmit a data signal regardless of whether the fuel cell system is running. In this manner, the user can perform the communication filling while the fuel cell is generating electric power and, thus, the marketability of the vehicle can be increased. In addition, if the fuel cell system is running when a data signal is generated to perform the communication filling, that is, if the fuel gas in the storage container is being consumed, the control unit sets the transmission value to a value obtained by correcting the reference value so that the amount of fuel gas monitored by the external filling device on the basis of the transmission value from the fuel-cell vehicle increases. That is, upon performing communication filling when the fuel cell system is running, the external filling device connected to the fuel-cell vehicle according to the present disclosure stops the charge of the fuel gas earlier than a completion time based on the reference value by a time period corresponding to the correction value. Accordingly, the above-described overcharge of the fuel gas can be prevented.

(2) The above-described overcharge caused by a delay of flow rate control performed by the external filling device (illustrated in FIG. 5) is prominent when the power generation amount of the fuel cell varies immediately before completion of the communication filling. That is, the present disclosure is particularly effective when the power generation amount of the fuel cell varies immediately before completion of the communication filling. In other words, even when the power generation amount of the fuel cell varies when a lot of time is left before completion of the communication filling (more specifically, when the hydrogen SOC is, for example, about 50% of the target value), the above-described overcharge caused by a delay of flow rate control negligibly occurs. Accordingly, when the fuel cell system is running and if the pressure or an amount of gas inside the storage container is greater than or equal to a predetermined threshold value (that is, if the fuel cell system is running in a near full charge state), the control unit sets the transmission value to a value obtained by correcting the reference value so that the amount of fuel gas monitored by the external filling device increases. In this manner, a situation in which the reference value is corrected at an inappropriate timing and, thus, the charge amount of the fuel gas is decreased to less than the necessary charge amount can be prevented.

(3) The state detection unit detects the temperature of the storage container, and the control unit sets the transmission value to a corrected value that is lower than the reference value determined on the basis of the detection value output from the state detection unit. That is, the control unit corrects the temperature of the storage container being charged so that the temperature is lower than an actual temperature and sends information regarding the corrected temperature to the external filling device. In this manner, the amount of fuel gas monitored by the external filling device can be increased and, thus, overcharge can be reliably prevented.

(4) The state detection unit detects the pressure of the storage container, and the control unit sets the transmission value to a corrected value that is higher than the reference value determined on the basis of the detection value output from the state detection unit. That is, the control unit corrects the pressure of the storage container being charged so that the pressure is higher than an actual pressure and sends information regarding the corrected pressure to the external filling device. In this manner, the amount of fuel gas monitored by the external filling device can be increased and, thus, overcharge can be reliably prevented.

(5) As the power generation amount of the fuel cell or the amount of the fuel gas consumed that is equivalent to the power generation amount increases, the power generation amount is more varied. Thus, the effect of a delay of flow rate control performed by the external filling device may increase. Accordingly, overcharge may occur by the effect. While taking into account such an issue, the control unit increases the correction amount applied to the reference value with increasing power generation amount of the fuel cell or increasing amount of the fuel gas consumed. In this manner, overcharge can be reliably prevented.

(6) According to the fuel-cell vehicle of another aspect of the present disclosure, for the same reason as that described in (1), while the fuel cell is generating electric power, the external filling device can perform the communication filling. Thus, the marketability of the fuel-cell vehicle can be increased. In addition, the control unit calculates the value of a charge parameter corresponding to the amount of fuel gas charged in the storage container. If the value of the charge parameter reaches a target value indicating a full charge, the control unit causes the transmitter to send a charge stop request signal or stop data signals sent from the transmitter (hereinafter, sending the charge stop request signal from the transmitter or stopping transmission of data signals during the communication filling is referred to as an "abort action). Some external filling devices has the abort call function to immediately stop charging the fuel gas if the abort action of the vehicle is detected during the communication filling. The fuel-cell vehicle of the present disclosure itself can stop charging using such an abort call function of the external filling device if the value of the charge amount parameter reaches the target value. In addition, if the fuel cell system is running, the control unit sets the target value to a value lower than a target value set when the fuel cell system is not running. That is, when performing the communication filling while the fuel cell system is running, the external filling device connected to the fuel-cell vehicle of the present disclosure detects the abort action from the vehicle at a timing earlier than the ordinary timing by reduction in the target value and stops charging the fuel gas. Accordingly, the above-described overcharge can be prevented.

Note that if communication of data signals is lost during the communication filling, some external filling device switch from the communication filling to non-communication filling so as to continue to charge the fuel gas. Accordingly, for such external filling devices having a charging method switching function, to stop charging, it is desirable for the transmitter of the vehicle to send an abort signal. In addition, for external filling devices without the charging method switching function, to stop charging, an abort signal may be sent, as described above, or transmission of data signals may be stopped.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel-cell vehicle comprising:
a storage container that stores fuel gas charged by an external filling device;
a fuel cell system that supplies the fuel gas stored in the storage container to a fuel cell and causes the fuel cell to generate electricity, the fuel-cell vehicle travelling using the fuel cell as a power source;
a state detection unit that detects a physical state regarding the storage container, the physical state being used for monitoring an amount of the fuel gas charged in the storage container;
a transmitter that transmits, to the external filling device, a data signal generated on the basis of a detection value output from the state detection unit;
a request detecting unit that generates a communication start request signal in response to a predetermined operation performed; and
a control unit that controls the state detection unit, the transmitter, and the request detecting unit,
wherein the control unit includes a signal generating unit that determines a transmission value indicating the physical state on the basis of the detection value output from the state detection unit and generates a data signal in accordance with the transmission value and a communication starting unit that upon detecting the communication start request signal, enables the transmitter to transmit the data signal regardless of whether the fuel cell system is running, and
wherein the signal generating unit sets the transmission value to a reference value preset on the basis of the detection value output from the state detection unit if the fuel cell system is not running and sets the transmission value to a value obtained by correcting the reference value so that the amount of fuel gas monitored by the external filling device increases if the fuel cell system is running.

2. The fuel-cell vehicle according to claim 1, wherein when the fuel cell system is running and if one of a pressure and the amount of fuel gas inside the storage container is greater than or equal to a predetermined threshold value, the signal generating unit sets the transmission value to a value obtained by correcting the reference value so that the amount of fuel gas monitored by the external filling device increases.

3. The fuel-cell vehicle according to claim 1, wherein the physical state represents a temperature of the storage container, and
wherein the signal generating unit sets the transmission value to a corrected value that is lower than the reference value.

4. The fuel-cell vehicle according to claim 1, wherein the physical state represents a pressure inside the storage container, and
wherein the signal generating unit sets the transmission value to a corrected value that is higher than the reference value.

5. The fuel-cell vehicle according to claim 1, wherein the signal generating unit increases a correction amount applied to the reference value with increasing power generation amount of the fuel cell or increasing amount of the fuel gas consumed by the fuel cell.

6. A fuel-cell vehicle comprising:
a storage container that stores fuel gas charged by an external filling device;
a fuel cell system that supplies the fuel gas stored in the storage container to a fuel cell and causes the fuel cell to generate electricity, the fuel-cell vehicle travelling using the fuel cell as a power source;
a state detection unit that detects a physical state regarding the storage container, the physical state being used for monitoring an amount of the fuel gas charged in the storage container;
a transmitter that transmits, to the external filling device, data signal generated on the basis of at least a detection value output from the state detection unit;
a request detecting unit that generates a communication start request signal in response to a predetermined operation performed; and
a control unit that controls the state detection unit, the transmitter, and the request detecting unit,
wherein the control unit includes a communication starting unit that upon detecting the communication start request signal, enables a signal to be transmitted regardless of whether the fuel cell system is running, a charge amount parameter calculating unit that calculates a value of a charge amount parameter corresponding to the amount of fuel gas, and a charge stop instructing unit that causes the transmitter to transmit a charge stop request signal to stop charge of the fuel gas or to stop transmission of the data signal if the value of the charge amount parameter reaches a target value indicating full charge, and
wherein if the fuel cell system is running, the charge stop instructing unit sets the target value to a value that is lower than the target value set when the fuel cell system is not running.

7. A fuel-cell vehicle comprising:
a storage container to store fuel gas charged from an external filling device;
a fuel cell system to supply the fuel gas stored in the storage container to a fuel cell to generate electricity, the fuel-cell vehicle being to travel using the fuel cell as a power source;
a state detector configured to detect a physical state in the storage container to monitor an amount of the fuel gas charged in the storage container;
a transmitter configured to transmit a data signal generated based on the physical state detected by the state detector to the external filling device;
a request detector configured to generate a communication start request signal in response to a predetermined operation performed; and
a controller comprising:
a signal generator configured to determine a transmission value indicating the physical state detected by the state detector so as to generate the data signal in accordance with the transmission value, the signal generator being configured to set the transmission value to a reference value preset based on the physical state detected by the state detector if the fuel cell system is not running and configured to set the transmission value to a value obtained by correcting the reference value so that the amount of the fuel gas to be monitored by the external filling device increases if the fuel cell system is running; and a communication starting device configured to enable the transmitter to transmit the data signal regardless of whether the fuel cell system is running upon detecting the communication start request signal.

8. The fuel-cell vehicle according to claim 7, wherein in a case where the fuel cell system is running and if one of a pressure and the amount of the fuel gas inside the storage container is greater than or equal to a predetermined threshold value, the signal generator sets the transmission value to a value obtained by correcting the reference value so that the amount of the fuel gas to be monitored by the external filling device increases.

9. The fuel-cell vehicle according to claim 7, wherein the physical state represents a temperature of the storage container, and wherein the signal generator sets the transmission value to a corrected value that is lower than the reference value.

10. The fuel-cell vehicle according to claim 7, wherein the physical state represents a pressure inside the storage container, and wherein the signal generator sets the transmission value to a corrected value that is higher than the reference value.

11. The fuel-cell vehicle according to claim 7, wherein the signal generator increases a correction amount applied to the reference value as power generation amount of the fuel cell increases or amount of fuel gas consumed by the fuel cell increases.

12. The fuel-cell vehicle according to claim 7, wherein in a case where the fuel cell system is running and if power generation amount of the fuel cell or amount of fuel gas consumed by the fuel cell becomes greater than a predetermined threshold value after the amount of the fuel gas charged in the storage container exceeds a predetermined threshold value, the signal generator sets the transmission value to a value obtained by correcting the reference value so that the amount of the fuel gas to be monitored by the external filling device increases.

* * * * *